US012262717B2

(12) United States Patent
Li et al.

(10) Patent No.: US 12,262,717 B2
(45) Date of Patent: *Apr. 1, 2025

(54) PESTICIDAL COMPOSITIONS WITH IMPROVED PHYSICAL CHARACTERISTICS

(71) Applicant: Terramera, Inc., Vancouver (CA)

(72) Inventors: Hangsheng Li, Vancouver (CA); Doug Ta Hung Chou, Vancouver (CA); Steven Chun Hon Lin, Vancouver (CA)

(73) Assignee: TERRAMERA, INC., Vancouver (CA)

( * ) Notice: Subject to any disclaimer, the term of this patent is extended or adjusted under 35 U.S.C. 154(b) by 1164 days.

This patent is subject to a terminal disclaimer.

(21) Appl. No.: 17/046,273

(22) PCT Filed: Apr. 17, 2019

(86) PCT No.: PCT/CA2019/050484
§ 371 (c)(1),
(2) Date: Oct. 8, 2020

(87) PCT Pub. No.: WO2019/195947
PCT Pub. Date: Oct. 17, 2019

(65) Prior Publication Data
US 2021/0145011 A1 May 20, 2021

Related U.S. Application Data

(60) Provisional application No. 62/655,335, filed on Apr. 10, 2018, provisional application No. 62/680,158, filed on Jun. 4, 2018.

(51) Int. Cl.

| | | |
|---|---|---|
| A61K 36/00 | (2006.01) | |
| A01N 25/04 | (2006.01) | |
| A01N 25/10 | (2006.01) | |
| A01N 25/30 | (2006.01) | |
| A01N 27/00 | (2006.01) | |
| A01N 31/16 | (2006.01) | |
| A01N 65/08 | (2009.01) | |
| A01N 65/10 | (2009.01) | |
| A01N 65/20 | (2009.01) | |
| A01N 65/22 | (2009.01) | |
| A01N 65/24 | (2009.01) | |
| A01N 65/26 | (2009.01) | |
| A01N 65/28 | (2009.01) | |
| A01N 65/36 | (2009.01) | |
| A01N 65/40 | (2009.01) | |

(52) U.S. Cl.
CPC ............ *A01N 65/26* (2013.01); *A01N 25/04* (2013.01); *A01N 25/10* (2013.01); *A01N 25/30* (2013.01); *A01N 27/00* (2013.01); *A01N 31/16* (2013.01); *A01N 65/08* (2013.01); *A01N 65/10* (2013.01); *A01N 65/20* (2013.01); *A01N 65/22* (2013.01); *A01N 65/24* (2013.01); *A01N 65/28* (2013.01); *A01N 65/36* (2013.01); *A01N 65/40* (2013.01)

(58) Field of Classification Search
None
See application file for complete search history.

(56) References Cited

U.S. PATENT DOCUMENTS

| | | | |
|---|---|---|---|
| 8,753,676 B2 * | 6/2014 | Kritzman | A61K 9/5031 424/408 |
| 2009/0186096 A1 | 7/2009 | Kritzman et al. | |
| 2014/0242199 A1 * | 8/2014 | Manhas | A01N 65/24 424/754 |

FOREIGN PATENT DOCUMENTS

| | | |
|---|---|---|
| CN | 1676001 A | 10/2005 |
| CN | 101554164 A | 10/2009 |
| CN | 102860301 A | 1/2013 |
| CN | 107047546 A | 8/2017 |
| WO | 2013050967 A1 | 4/2013 |

OTHER PUBLICATIONS

Campos et al. (2016) Frontiers in Plant Science vol. 7, Article 1494. (Year: 2016).*
"Plant Chemical Protection 4th Edition", edited by Xu Hanhong, pp. 32-33, China Agriculture Press, Publication Date: Sep. 30, 2007.
"Application of Polymers in Oil and Gas Field Exploitation", edited by Xu Mingbiao et al., pp. 212-216, China University of Geosciences Press, Publication Date: Jan. 31, 2010.
"Insecticidal Plants and Botanical Insecticides", edited by Xu Hanhong, p. 288, China Agriculture Press, Publication Date: Aug. 31, 2001.
Huang, Yu Yuan et al., "Manual of Common Raw Materials for Fine Chemical Formulas", Guangdong Science and Technology Press, p. 100-101, publication date Dec. 31, 1985.
Zhan, Yi Xing, "New chemical products Episode 3", Beijing Science and Technology Literature Press,p. 185, publication date: Oct. 31, 2007.
Liang, Xi Yi, "Chemistry of Forest Products Manufacturing", China Forestry Publishing House,p. 230-231, 241, publication date: Dec. 31, 1985.

* cited by examiner

*Primary Examiner* — Russell G Fiebig
(74) *Attorney, Agent, or Firm* — Viridant IP

(57) ABSTRACT

Pesticidal compositions for improving physical characteristics of pesticide formulations which comprise natural pesticidal oil active ingredients are disclosed. One such composition comprises a pesticidal natural oil active ingredient, a surfactant to disperse the active ingredient in a water emulsion and a polymeric pour point depressant effective to reduce a pour point temperature of the pesticidal natural oil active ingredient. Methods for providing pesticidal compositions and application to control one or more pests are also disclosed.

20 Claims, No Drawings

PESTICIDAL COMPOSITIONS WITH IMPROVED PHYSICAL CHARACTERISTICS

REFERENCE TO RELATED APPLICATIONS

This application is a 371 national phase entry of Patent Cooperation Treaty patent application No. PCT/CA2019/050484 filed 17 Apr. 2019, which claims priority to, and the benefit of, U.S. provisional patent application Nos. 62/655,355 filed 10 Apr. 2018 entitled PESTICIDAL COMPOSITIONS WITH IMPROVED PHYSICAL CHARACTERISTICS; and 62/680,158 filed 4 Jun. 2018; entitled NATURAL OIL PESTICIDAL COMPOSITIONS. All of the foregoing applications are incorporated by reference herein in their entireties.

TECHNICAL FIELD

Some embodiments of the present disclosure relate generally to pesticidal compositions. In particular, some embodiments of the present invention relate to pesticidal compositions with improved physical characteristics such as those related to the physical handling of the composition enabling improved application of the pesticidal composition such as for agricultural, horticultural or household pest control.

BACKGROUND

Pesticides, including fungicides, herbicides, nematicides and insecticides, are important compositions for use in domestic, agricultural, industrial and commercial settings, such as to provide for control of unwanted pests and/or pathogens. Providing for effective pest control is of high importance in many such settings, since pests and/or other pathogens if not controlled can cause loss and or destruction of crops or other plants, or harm to animals, humans or other beneficial or desired organisms. There remains a need for environmentally safe and effective pesticides, including fungicidal, nematicidal and insecticidal pesticide compositions that enhance the utility and efficacy of pesticides, so that pesticides can be used in a more environmentally safe and effective manner.

In agricultural settings, for example, a variety of plant pests, such as insects, worms, nematodes, fungi, and plant pathogens such as viruses and bacteria, are known to cause significant damage to seeds and ornamental and crop plants. Conventional chemical pesticides have generally been used, but many of these are expensive and potentially toxic to humans, animals, and/or the environment and may persist long after they are applied. In a growing number of cases, chemical pesticide use has also resulted in growing resistance to certain chemical pesticides by pest organisms, leading to reduced effectiveness, requiring greater doses of pesticidal chemicals, or even failure of certain types of pesticides as viable control agents. As a result, many chemical pesticides are being phased out or otherwise restricted from use.

Natural or biologically-derived pesticidal compounds have been proposed for use in place of some chemical pesticides, in order to attempt to reduce the toxicity, health and environmental risks associated with chemical pesticide use. Pesticidal natural oils are a known class of biopesticides, including for uses in control of insect, fungal, nematode, bacterial and weed pests, for example. There remains a need to provide improved natural pesticidal oil based pesticidal compositions to allow for safe, easy, effective, economical and environmentally and ecologically safe control of insect, plant, fungal, nematode, mollusk, mite, viral and bacterial pests. In particular, there remains a need to provide improved natural pesticidal oil based pesticidal compositions having improved physical characteristics, including improved low temperature flow characteristics.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

In some embodiments of the present invention, novel pesticidal compositions are disclosed comprising: a pesticidal natural oil active ingredient, a surfactant operable to disperse the pesticidal natural oil active ingredient in a water emulsion, and a polymeric pour point depressant effective to reduce a pour point temperature of said pesticidal natural oil active ingredient.

In some embodiments, the pesticidal composition comprises at least one pesticidal natural oil active ingredient selected from the list comprising: neem oil, karanja oil, cinnamon oil, clove oil, eugenol, oregano oil, thyme oil, garlic oil, anise oil, geranium oil, lime oil, peppermint oil, lavender oil, and combinations thereof or extracts therefrom.

In some embodiments, the pesticidal composition comprises a pesticidal natural oil active ingredient characterized by having a lower pour point temperature, wherein said pour point temperature of said pesticidal natural oil active ingredient is between about −5 C and about 30 C. In one such embodiment, the pour point temperature may be defined as the lowest temperature at which the pesticidal natural oil may be fluidly poured from one container to another, that is, the lowest temperature at which the pesticidal natural oil remains pourably fluid and not gelled. In some embodiments, the polymeric pour point depressant may be operable to reduce the pour point temperature of the pesticidal natural oil by at least 0.5 C, and preferably 1 C, and further preferably by at least 1.5 C, and more preferably by at least 2 C, and more desirably by at least 3 C, and most desirably by at least 4 C, for example.

In some embodiments, the pesticidal composition may desirably a natural oil active ingredient comprising neem oil. In another embodiment, the pesticidal natural active ingredient may comprise a karanja material derived from *Pongamia* spp. (also known as *Millettia* spp.) such as karanja oil (also referred to as *Pongamia* oil).

In some embodiments, the pesticidal composition comprises a polymeric pour point depressant which comprises at least one of an acrylic polymer and an alkyl aromatic polymer. In some particular embodiments, the polymeric pour point depressant may comprise at least one of: a poly methacrylate, a polyalkyl methacrylate, a polyacrylate, an acrylate-styrene copolymer and an alkyl aromatic polymer. In some further embodiments, the polymeric pour point depressant may comprise at least one polymer listed by the US Environmental Protection Agency (EPA) as a Minimal Risk Inert Pesticide Ingredient (4A) (i.e. the list of ingredients published by the US EPA as FIFRA 4A list published August 2004 entitled "List 4A—Minimal Risk Inert Ingredients") or, at least one polymer listed by the EPA as Inert Pesticide Ingredients (4B) (the US EPA FIFRA 4b list published August 2004 entitled "List 4B—Other ingredients for which EPA has sufficient information"), or at least one polymer listed under EPA regulation 40 CFR 180.950 dated May 24, 2002, each of which is hereby incorporated herein in its entirety for all purposes.

In some embodiments, the pesticidal composition may comprise a polymeric pour point depressant which comprises at least one of a crystallization inhibitor and a co-crystallization modifier of at least one wax component of the pesticidal natural oil. In some embodiments, the polymeric pour point depressant may additional comprise at least one diluent or carrier component. In some particular such embodiments, the polymeric pour point depressant may additionally comprise a neutral oil component, such as a neutral mineral or vegetable oil component, for example.

In some embodiments, the pesticidal composition may comprise a surfactant which comprises at least one of: ethoxylated castor oil, saponin, ethoxylated alcohols, ethoxylated fatty esters, alkoxylated glycols, ethoxylated fatty acids, carboxylated alcohols, carboxylic acids, fatty acids, ethoxylated alkylphenols, fatty esters, sodium dodecylsulfide, other fatty acid-based surfactants, other natural or synthetic surfactants, or a combination thereof. In some particular such embodiments, the surfactant may comprise a non-ionic surfactant comprising at least one of: ethoxylated castor oil, fatty acids, fatty esters, an octyl-phenol ethoxylate, and combinations thereof.

In some embodiments, the pesticidal composition may additionally comprise a diluent. In some particular such embodiments, the diluent may comprise at least one neutral oil component, such as one or more of a safflower, canola, vegetable, or mineral oil. In some other such embodiments, the diluent may comprise at least one of: isopropyl alcohol, isopropyl myristate, and combinations thereof. In a further such embodiment, the diluent may additionally comprise at least one carrier component.

In some embodiments, the pesticidal composition may comprise a pesticidal natural oil active ingredient which comprises at least one of neem oil and karanja oil, and wherein the polymeric pour point depressant is operable to inhibit or modify crystallization of at least one of a wax and a fatty acid component of said pesticidal natural oil. In some particular such embodiments, the at least one wax or fatty acid component of the pesticidal natural oil has a melting point above about 15 C. In some other such embodiments, the at least one wax or fatty acid component of the pesticidal natural oil may have a melting point above about 10 C, and in yet some other embodiments, above about 5 C for example.

In some embodiments, the pesticidal composition may additionally comprise at least one additional natural pesticidal active ingredient. In some particular such embodiments, the additional natural pesticidal active ingredient may comprise an extract of at least one natural pesticidal oil. In some embodiments, the pesticidal composition may comprise a natural pesticidal oil active ingredient which comprises at least one NOP-listed organic natural oil, listed under the US Department of Agriculture (USDA) National Organic Program (NOP), or OMRI, or other organic or other selected agricultural standard certification for example, such as may be listed by the USDA as allowable for use in organic agricultural production or the like.

In some embodiments, a pesticidal composition may be provided such that the composition comprises a substantially homogenous pesticidal concentrate, wherein:
  the pesticidal natural oil active ingredient comprises 50 to 90 wt %;
  the surfactant comprises 4 to 25 wt %; and
  the polymeric pour point depressant comprises 0.1 to 10 wt % of the pesticidal concentrate.

In some particular such embodiments, the pesticidal composition may additionally comprising a diluent which comprises 5 to 20 wt % of the substantially homogenous pesticidal concentrate, for example. In some such embodiments, the pesticidal composition may comprise at least one polymeric pour point depressant which comprises a USDA NOP-listed polymeric compound such as may be allowable for use in organic agriculture, for example. In some further embodiments, the polymeric pour point depressant may comprise at least one polymer listed by the US Environmental Protection Agency (EPA) as a Minimal Risk Inert Pesticide Ingredient (4A) (i.e. the list of ingredients published by the US EPA as FIFRA 4A list published August 2004 entitled "List 4A—Minimal Risk Inert Ingredients") or, at least one polymer listed by the EPA as Inert Pesticide Ingredients (4B) (the US EPA FIFRA 4b list published August 2004 entitled "List 4B—Other ingredients for which EPA has sufficient information"), or at least one polymer listed under EPA regulation 40 CFR 180.950 dated May 24, 2002, each of which is hereby incorporated herein in its entirety for all purposes.

In some further embodiments, a method a method of making a diluted pesticidal composition including at least one pesticidal natural oil active ingredient is provided. In some such embodiments, the method comprises:
  providing a homogenous concentrate composition which comprises:
  a pesticidal natural oil active ingredient;
  a surfactant operable to disperse the pesticidal natural oil active ingredient in a water emulsion; and
  a polymeric pour point depressant operable to reduce a pour point temperature of said pesticidal natural oil active ingredient; and
  diluting the concentrate with water to form an oil in water emulsion diluted formulation comprising the at least one pesticidal natural oil active ingredient.

In some particular embodiments of the above exemplary method, the pour point temperature of the pesticidal natural oil active ingredient may be between about −5 C and about 30 C. In some embodiments, the pesticidal natural oil active ingredient comprises at least one of neem oil and karanja oil. In some further embodiments, the pesticidal composition additionally comprises at least one diluent or carrier component. In one such embodiment, the at least one diluent or carrier may comprise a neutral oil, such as a mineral or vegetable oil, for example.

In some embodiments, the pesticidal composition in the above method comprises a polymeric pour point depressant which comprises at least one of an acrylic polymer and an alkyl aromatic polymer. In some particular embodiments, the polymeric pour point depressant may comprise at least one of: a poly methacrylate, a polyalkyl methacrylate, a polyacrylate, an acrylate-styrene copolymer and an alkyl aromatic polymer. In some further embodiments, the polymeric pour point depressant may comprise at least one polymer listed by the US Environmental Protection Agency (EPA) as a Minimal Risk Inert Pesticide Ingredient (4A) (i.e. the list of ingredients published by the US EPA as FIFRA 4A list published August 2004 entitled "List 4A—Minimal Risk Inert Ingredients") or, at least one polymer listed by the EPA as Inert Pesticide Ingredients (4B) (the US EPA FIFRA 4b list published August 2004 entitled "List 4B—Other ingredients for which EPA has sufficient information"), or at least one polymer listed under EPA regulation 40 CFR 180.950 dated May 24, 2002, each of which is hereby incorporated herein in its entirety for all purposes.

In some embodiments, the pesticidal composition may comprise a polymeric pour point depressant which comprises at least one of a crystallization inhibitor and a co-crystallization modifier of at least one wax component of the pesticidal natural oil. In some embodiments, the polymeric pour point depressant may additional comprise at least one diluent or carrier component. In some particular such embodiments, the polymeric pour point depressant may additionally comprise a neutral oil component, such as a neutral mineral or vegetable oil component, for example.

In a further embodiment according to the present disclosure, a method of enhancing the physical properties of a pesticidal natural oil active ingredient comprising at least one of neem and karanja oil is provided, the method comprising:
  preparing a homogenous pesticidal concentrate composition comprising:
  said pesticidal natural oil active ingredient comprising at least one of neem and karanja oil;
  a surfactant operable to disperse the pesticidal natural oil active ingredient in a water emulsion; and
  a polymeric pour point depressant operable to reduce a pour point temperature of said pesticidal natural oil active ingredient; and
  diluting the pesticidal concentrate with water to form an oil-in-water emulsion diluted formulation comprising the at least one pesticidal natural oil active ingredient adapted for application to plants to control at least one pest.

In yet another embodiment according to the present disclosure, a method of applying at least one pesticidal composition comprising at least one pesticidal natural oil to control at least one target pest is provided. In one such embodiment, the method comprises:
  preparing a homogenous pesticidal concentrate composition according to the method of enhancing the physical properties of a pesticidal natural oil active ingredient described directly above; and
  applying the oil-in-water emulsion diluted pesticidal formulation to at least one plant, the locus thereof, or propagation material thereof, which is susceptible to or infested with the at least one pest.

In some particular such embodiments, the diluted pesticidal formulation may be applied to the at least one plant, locus thereof, or propagation material thereof, in a pesticidally effective amount to desirably provide for control of the at least one pest, for example.

In addition to the exemplary aspects and embodiments described above, further aspects and embodiments will become apparent by reference to the following detailed description.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and tables/drawings are to be regarded in an illustrative, rather than a restrictive, sense.

Unless defined otherwise, all technical and scientific terms used herein have the same meaning as commonly understood by one of ordinary skill in the art to which this disclosure belongs.

As used herein, singular forms include plural references unless the context clearly dictates otherwise. As used herein, "comprises" or "comprising" are to be interpreted in their open-ended sense, i.e. as specifying that the stated features, elements, steps or components referred to are present, but not excluding the presence or addition of further features, elements, steps or components.

As used herein, all numerical values or numerical ranges provided expressly include integers within such ranges and fractions of the values or the integers within ranges unless the context clearly indicates otherwise. Thus, for example, reference to a range of 90-100%, includes 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, etc., and so forth. Therefore, as used herein, where a range of values is provided, it is understood that each intervening value between the upper and lower limit of that range and any other stated or intervening value within that stated range is encompassed within embodiments of the disclosure. The upper and lower limits of these smaller ranges may independently define a smaller range of values, and it is to be understood that these smaller ranges are intended to be encompassed within embodiments of the disclosure, subject to any specifically excluded limit in the stated range.

As used herein, "plant" embraces individual plants or plant varieties of any type of plants, in particular agricultural, silvicultural and ornamental plants.

As used herein, the terms "pest" or "pests" or grammatical equivalents thereof, are understood to refer to organisms, e.g., including pathogens, that negatively affect a host or other organism—such as a plant or an animal—by colonizing, damaging, attacking, competing with them for nutrients, infesting or infecting them, as well as undesired organisms that infest human structures, dwellings, living spaces or foodstuffs. Pests include but are not limited to fungi, weeds, nematodes, acari, and arthropods, including insects. It is understood that the terms "pest" or "pests" or grammatical equivalents thereof can refer to organisms that have negative effects by infesting plants and seeds, and commodities such as stored grain or other agricultural products.

As used herein, the terms "pesticide" or "pesticidal" or grammatical equivalents thereof, are understood to refer to any composition or substance that can be used in the control of any agricultural, natural environmental, and domestic/household pests. The terms "control" or "controlling" are meant to include, but are not limited to, any killing, inhibiting, growth regulating, or pestistatic (inhibiting or otherwise interfering with the normal life cycle of the pest) activities of a composition against a given pest. These terms include for example sterilizing activities which prevent the production or normal development of seeds, ova, sperm or spores, cause death of seeds, sperm, ova or spores, or otherwise cause severe injury to the genetic material. Further activities intended to be encompassed within the scope of the terms "control" or "controlling" include preventing larvae from developing into mature progeny, modulating the emergence of pests from eggs including preventing eclosion, degrading the egg material, suffocation, interfering with mycelial growth, reducing gut motility, inhibiting the formation of chitin, disrupting mating or sexual communication, preventing feeding (antifeedant) activity, and interfering with location of hosts, mates or nutrient-sources. The term "pesticide" includes fungicides, herbicides, nematicides, insecticides and the like. The term "pesticide" encompasses, but is not limited to, naturally occurring compounds as well as so-called "synthetic chemical pesticides" having structures or formulations that are not naturally occurring, where pesticides may be obtained by various means including, but not limited to, extraction from biological sources, chemical synthesis of the compound, and chemical modification of naturally occurring compounds obtained from biological sources.

As used herein, the terms "control" or "controlling" or grammatical equivalents thereof, are understood to encompass any pesticidal (killing) activities or peststatic (inhibiting, repelling, deterring, and generally interfering with pest functions to prevent the damage to the host plant) activities of a pesticidal composition against a given pest. Thus, the terms "control" or "controlling" or grammatical equivalents thereof, not only include killing, but also include such activities as repelling, deterring, inhibiting or killing egg development or hatching, inhibiting maturation or development, and chemi-sterilization of larvae or adults. Repellant or deterrent activities may be the result of compounds that are poisonous, mildly toxic, or non-poisonous to pests, or may act as pheromones in the environment.

As used herein, the term "pesticidally effective amount" generally means the amount of the inventive mixtures or of compositions comprising the mixtures needed to achieve an observable effect on growth, including the effects of necrosis, death, retardation, prevention, and removal, destruction, or otherwise diminishing the occurrence and activity of the target pest organism. The pesticidally effective amount can vary for the various mixtures/compositions used in the invention. A pesticidally effective amount of the mixtures/compositions will also vary according to the prevailing conditions such as desired pesticidal effect and duration, weather, target species, locus, mode of application, and the like.

In some embodiments of the present invention, novel pesticidal compositions are disclosed comprising: a pesticidal natural oil active ingredient, a surfactant operable to disperse the pesticidal natural oil active ingredient in a water emulsion, and a polymeric pour point depressant effective to reduce a pour point temperature of said pesticidal natural oil active ingredient.

In some embodiments as described herein, an emulsifier or other surfactant may be used in preparing pesticidal compositions according to aspects of the present disclosure, such as may be operable to disperse a pesticidal natural oil active ingredient in a water emulsion, for example. Suitable such surfactants can be selected by one skilled in the art. Examples of surfactants that can be used in some embodiments of the present disclosure include, but are not limited to sodium lauryl sulfate, saponin, ethoxylated alcohols, ethoxylated fatty esters, alkoxylated glycols, ethoxylated fatty acids, ethoxylated castor oil, glyceryl oleates, carboxylated alcohols, carboxylic acids, fatty acids, ethoxylated alkylphenols, fatty esters, sodium dodecylsulfide, other fatty acid-based surfactants, other natural or synthetic surfactants, and combinations thereof. In some embodiments, the surfactant(s) are non-ionic surfactants. In some embodiments, the surfactant(s) are cationic or anionic surfactants. In some embodiments, a surfactant may comprise two or more surface active agents used in combination. The selection of an appropriate surfactant depends upon the relevant applications and conditions of use, and selection of appropriate surfactants are known to those skilled in the art.

In some embodiments, the pesticidal composition comprises a polymeric pour point depressant comprising at least one polymeric material. As used herein, the term "polymeric material" is used to describe a material, compound or composition that is defined by or includes at least one polymer or a derivative thereof. In one non-limiting example, the polymeric material includes acrylic acid, acrylate, or other acryl-derived units. In other examples, the polymeric material may include derivatives of alkyl aromatic compounds and/or one or more derivatives thereof. In one specific example, the polymeric material may comprise a poly acrylic methacrylate (PAMA) pour point depressant polymeric material, for example. Exemplary such PAMA polymeric pour point depressants may be commercially obtained from Dai-Ichi Karkaria Ltd. of Maharashtra, India, The Lubrizol Corporation, OH, USA, from Evonik Oil Additives GMBH, of Darmstadt, Germany (as an Evonik Viscoplex™ 10-series polymeric pour point depressant), or from A S Harrison Co, Pty, of Sydney Australia. It should be appreciated that a mixture of two or more of the foregoing non-limiting polymeric material examples could also be included in one or more of the pesticidal compositions described in this disclosure.

In one aspect, a pesticidal composition according to some embodiments of the present disclosure additionally comprises one or more suitable carrier or diluent component. A suitable carrier or diluent component can be selected by one skilled in the art, depending on the particular application desired and the conditions of use of the composition. Commonly used carriers and diluents may include ethanol, isopropanol, isopropyl myristate, other alcohols, water, neutral oils such as one or more of mineral and vegetable oils, and other inert carriers, such as but not limited to those listed by the EPA as a Minimal Risk Inert Pesticide Ingredients (4A) (the list of ingredients published dated December 2015 by the US EPA FIFRA 4a list published August 2004 entitled "List 4A—Minimal Risk Inert Ingredients") or, for example, Inert Pesticide Ingredients (4B) (the US EPA FIFRA 4b list published August 2004 entitled "List 4B—Other ingredients for which EPA has sufficient information") or under EPA regulation 40 CFR 180.950 dated May 24, 2002, each of which is hereby incorporated herein in its entirety for all purposes.

In some embodiments, pesticidal compositions herein disclosed may also be used, for reasons such as but not limited to economy, physical and chemical stability and synergy, with acaricides, algicides, antifeedants, avicides, bactericides, bird repellents, chemosterilants, fungicides, herbicide safeners, herbicides, insect attractants, insect repellents, mammal repellents, mating disrupters, molluscicides, other insecticides, other pesticides, plant activators, plant growth regulators, rodenticides, synergists, adjuvants, defoliants, desiccants, disinfectants, semiochemicals, and virucides (these categories not necessarily mutually exclusive), for example.

In some embodiments, pesticidal compositions described in this disclosure may also be provided with phytologically-acceptable inert ingredients to provide or complement a carrier and can be formulated into, for example, concentrated emulsions, dusts, emulsifiable concentrates, gels, granules, microencapsulations, seed treatments, suspension concentrates, suspension emulsions, and pellets, for example. For further information on suitable such formulation types known to those of skill in the art, reference may be made to publications such as, for example: "CATALOGUE OF PESTICIDE FORMULATION TYPES AND INTERNATIONAL CODING SYSTEM" Technical Monograph No 2, 5th Edition by CropLife International (2002).

In some embodiments, pesticidal compositions according to aspects of the present disclosure may be applied as aqueous suspensions or emulsions prepared from concentrated formulations of such compositions. Such water-soluble, water-suspendable, or emulsifiable formulations may be provided as liquids typically known as emulsifiable concentrates, aqueous suspensions or oil suspensions. In an alternative embodiment, pesticidal compositions may alternatively be provided as solids, typically known as wettable powders, or water dispersible granules. In such embodiments, wettable powders, which may be compacted to form water dispersible granules, comprise an intimate mixture of the pesticide composition, a carrier, and surfactants. In some such embodiments, a carrier may typically be chosen from among: attapulgite and montmorillonite clay, diatomaceous earth, or purified silicates, for example. Effective surfactants for wettable powders and/or granules, which may typically comprise from about 0.5% to about 10% of the wettable powder/granule, may comprise sulfonated lignins, condensed naphthalenesulfonates, naphthalenesulfonates, alkylbenzenesulfonates, alkyl sulfates, and nonionic surfactants such as ethylene oxide adducts of alkyl phenols, for example.

In some embodiments, pesticidal compositions according to aspects of the present disclosure may be provided as emulsifiable concentrates, which may comprise a convenient concentration of a pesticidal composition that comprises a mixture of water-immiscible and emulsifier (or surfactant) components. In some embodiments, suitable emulsifiers for emulsifiable concentrates may be chosen from anionic and nonionic surfactants.

In some alternative embodiments, pesticidal compositions according to aspects of the present disclosure may be applied as granular formulations that are particularly useful for applications to soil. Exemplary such granular formulations may contain the pesticide composition dispersed in a carrier that comprises clay or a similar substance. Such formulations may typically be prepared by dissolving the pesticide composition in a suitable solvent and applying it to a granular carrier which has been pre-formed to the appropriate particle size, such as in the range of from about 0.5 to 3 mm. Such formulations may also be formulated by making a dough or paste of the carrier and pesticide composition and crushing and drying to obtain the desired granular particle size.

In some further embodiments, dusts, granules, gels or particles containing a pesticidal composition may be prepared by intimately mixing the pesticidal composition with a suitable dust, granular, gel or particulate agricultural carrier, such as kaolin clay, ground volcanic rock, peat, cellulose, clays, hydrogels, charcoal, and the like, for example. Dusts, granules, gels or particles can be applied as suitable, such as as a seed dressing, soil amendment, top dressing, or as a foliar application with a dust blowing machine in the case of dusts, for example.

In some embodiments, pesticidal compositions may also be applied to treatment loci in the form of an aerosol formulation. In such formulations, the pesticidal composition may typically be dissolved or dispersed in an aerosol carrier, such as a pressure-generating propellant mixture. The aerosol formulation may be packaged in or compressed within a container from which the mixture is dispensed through an atomizing valve, for example.

In some other embodiments, the pesticidal composition may comprise an oil-in-water emulsion, wherein the emulsion comprises oily globules which are each provided with a lamellar liquid crystal coating and are dispersed in an aqueous phase, wherein each oily globule comprises at least one compound which is agriculturally active, and is individually coated with a monolamellar or oligolamellar layer comprising: (1) at least one non-ionic lipophilic surface-active agent, (2) at least one non-ionic hydrophilic surface-active agent and (3) at least one ionic surface-active agent, wherein the globules having a desired mean particle diameter, such as of less than about 800 nanometers, for example. For further information on suitable such formulation types known to those of skill in the art, reference may be made to publications such as, for example: "INSECT PEST MANAGEMENT" 2nd Edition by D. Dent, copyright CAB International (2000); and/or: "HANDBOOK OF PEST CONTROL—THE BEHAVIOR, LIFE HISTORY, AND CONTROL OF HOUSEHOLD PESTS" by Arnold Mallis, 9th Edition, copyright 2004 by GIE Media Inc.

Other Formulation Components

In some embodiments, when the pesticidal compositions disclosed in this disclosure are used in a formulation, such formulation may also contain other components. These components include, but are not limited to, (for greater clarity, the following is a non-exhaustive and non-mutually exclusive list) wetters, spreaders, stickers, penetrants, buffers, sequestering agents, drift reduction agents, compatibility agents, anti-foam agents, cleaning agents, rheology modifying agents, stabilizers, dispersing agents, and emulsifiers. A few exemplary such additional formulation components are described below.

A wetting agent is a substance that when added to a liquid increases the spreading or penetration power of the liquid by reducing the interfacial tension between the liquid and the surface on which it is spreading. Wetting agents are used for two main functions in agrochemical formulations: during processing and manufacture to increase the rate of wetting of powders in water to make concentrates for soluble liquids or suspension concentrates; and during mixing of a product with water in a spray tank to reduce the wetting time of wettable powders and to improve the penetration of water into water-dispersible granules. Examples of wetting agents used in wettable powder, suspension concentrate, and water-dispersible granule formulations are: sodium lauryl sulphate; sodium dioctyl sulphosuccinate; alkyl phenol ethoxylates; and aliphatic alcohol ethoxylates.

A dispersing agent is a substance which adsorbs onto the surface of particles and helps to preserve the state of dispersion of the particles and prevents them from reaggregating. Dispersing agents are added to agrochemical formulations to facilitate dispersion and suspension during manufacture, and to ensure the particles redisperse into water in a spray tank. They are widely used in wettable powders, suspension concentrates and water-dispersible granules. Surfactants that are used as dispersing agents have the ability to adsorb strongly onto a particle surface and provide a charged or steric barrier to reaggregation of particles. The most commonly used surfactants are anionic, non-ionic, or mixtures of the two types. For wettable powder formulations, the most common dispersing agents are sodium lignosulphonates. For suspension concentrates, very good adsorption and stabilization are obtained using polyelectrolytes, such as sodium naphthalene sulphonate formaldehyde condensates. Tristyrylphenol ethoxylate phosphate esters are also used. Non-ionics such as alkylarylethylene oxide condensates and EO-PO block copolymers are sometimes combined with anionics as dispersing agents for suspension concentrates. In recent years, new types of very high molecular weight polymeric surfactants have been developed as dispersing agents. These have very long hydrophobic 'backbones' and a large number of ethylene oxide chains forming the 'teeth' of a 'comb' surfactant. These high molecular weight polymers can give very good long-term stability to suspension concentrates because the hydrophobic backbones have many anchoring points onto the particle surfaces. Examples of dispersing agents used in agrochemical formulations are: sodium lignosulphonates; sodium naphthalene sulphonate formaldehyde condensates; tristyrylphenol ethoxylate phosphate esters; aliphatic alcohol ethoxylates; alkyl ethoxylates; EO-PO block copolymers; and graft copolymers.

An emulsifying agent is a substance which stabilizes a suspension of droplets of one liquid phase in another liquid phase. Without the emulsifying agent the two liquids would typically separate into two immiscible liquid phases. Exemplary commonly used emulsifier blends may contain alkylphenol or aliphatic alcohol with 12 or more ethylene oxide units and the oil-soluble calcium salt of dodecylbenzene sulphonic acid for example. In some embodiments, a range of hydrophile-lipophile balance ("HLB") values from 8 to 18 will normally provide good stable emulsions. Emulsion stability can sometimes be improved by the addition of a small amount of an EO-PO block copolymer surfactant.

A solubilizing agent is a surfactant which will form micelles in water at concentrations above the critical micelle concentration. The micelles are then able to dissolve or solubilize water-insoluble materials inside the hydrophobic part of the micelle. Exemplary types of surfactants usually used for solubilization include non-ionics: sorbitan monooleates; sorbitan monooleate ethoxylates; and methyl oleate esters.

Thickeners or gelling agents may be typically used mainly in the formulation of suspension concentrates, emulsions and suspoemulsions to modify the rheology or flow properties of the liquid and to prevent separation and settling of the dispersed particles or droplets. Thickening, gelling, and anti-settling agents generally fall into two categories, namely water-insoluble particulates and water-soluble polymers. In some examples, it is possible to produce suspension concentrate formulations using clays and silicas. Examples of these types of materials, include, but are limited to, montmorillonite, e.g. bentonite; magnesium aluminum silicate; and attapulgite. Water-soluble polysaccharides have been used as thickening-gelling agents for many years. The types of polysaccharides most commonly used are natural extracts of seeds and seaweeds are synthetic derivatives of cellulose. Examples of these types of materials include, but are not limited to, guar gum; locust bean gum; carrageenam; alginates; methyl cellulose; sodium carboxymethyl cellulose (SCMC); hydroxyethyl cellulose (HEC). Other types of anti-settling agents are based on modified starches, polyacrylates, polyvinyl alcohol, polyethylene oxide and xanthan gum.

The presence of surfactants, which lower interfacial tension, often causes water-based formulations to foam during mixing operations in production and in application of a pesticidal composition through a spray tank. In order to reduce the tendency to foam, anti-foam agents are often added either during the production stage or before filling into bottles. Generally, there are two types of anti-foam agents, namely silicones and non-silicones. Silicones may usually comprise aqueous emulsions of dimethyl polysiloxane while the non-silicone anti-foam agents comprise water-insoluble oils, such as octanol and nonanol, or silica. In both cases, the function of the anti-foam agent is to displace the surfactant from the air-water interface. For further information on suitable such other formulation components known to those of skill in the art, reference may be made to publications such as, for example: "CHEMISTRY AND TECHNOLOGY OF AGROCHEMICAL FORMULATIONS" edited by D. A. Knowles, copyright 1998 by Kluwer Academic Publishers; and/or: "INSECTICIDES IN AGRICULTURE AND ENVIRONMENT—RETROSPECTS AND PROSPECTS" by A. S. Perry, I. Yamamoto, I. Ishaaya, and R. Perry, copyright 1998 by Springer-Verlag.

Applications

In some embodiments, the actual amount of a pesticidal composition to be applied to loci of pests may generally not be critical and can readily be determined by those skilled in the art through experience and/or trial and error in application rates, for example. In general, concentrations within a range of about 0.01 grams of pesticidal active ingredient per hectare to about 5000 grams of pesticidal active ingredient per hectare may commonly be use to establish a desired range of application rates expected to provide good control.

EXAMPLES

Exemplary embodiments of the present invention are further described with reference to the following examples, which are intended to be illustrative and non-limiting in nature.

Example 1

An exemplary pesticidal composition comprising neem oil, a suitable surfactant, and a polymeric pour point depressant was prepared according to the following description. In an open mixing vessel, 849 g of cold pressed neem oil, 81 g of white mineral oil, 50 g of octylphenol ethoxylate surfactant and 20 g of an acrylic polymer pour point depressant were mixed using a shear mixer at approximately 20 C (room temperature). The composition of the resulting pesticidal composition is therefore as shown below in Table 1:

TABLE 1

| Pesticidal Composition Example 1 | |
| --- | --- |
| Component | % by weight |
| Cold pressed neem oil | 84.9 |
| White mineral oil | 8.1 |
| Octylphenol ethoxylate surfactant | 5.0 |
| Acrylic polymer pour point depressant | 2.0 |

The resulting pesticidal composition Example 1 was found to have a minimum pour point temperature of approximately 1.5-2.0 C. In one such exemplary embodiment, the white mineral oil may comprise Carnation™ mineral oil available from Sonneborn LLC, of Parsippany, NJ, USA. In some such embodiments, the octylphenol ethoxylate surfactant may comprise Triton X-45 surfactant available from Dow Chemical Co., of Midland, MI, USA. In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, Germany, or from A S Harrison Co, Pty, of Sydney Australia.

In contrast, a substantially similar pesticidal composition to that of Example 1 was prepared, but prepared without an acrylic polymer pour point depressant and instead substituting 2.0 wt. % of a neutral oil such as safflower or canola oil. In such case, the resulting pesticidal composition was found to have a minimum pour point temperature of approximately 8.0-8.5 C.

Example 2

An exemplary pesticidal composition comprising neem oil, a suitable surfactant, and a polymeric pour point depressant was prepared according to the following description. In an open mixing vessel, 849 g of cold pressed neem oil, 31 g of white mineral oil, 100 g of ethoxylated castor oil oleate surfactant and 20 g of an acrylic polymer pour point depressant were mixed using a shear mixer at approximately 20 C (room temperature). The composition of the resulting pesticidal composition is therefore as shown below in Table 2:

TABLE 2

Pesticidal Composition Example 2

| Component | % by weight |
| --- | --- |
| Cold pressed neem oil | 84.9 |
| White mineral oil | 3.1 |
| Ethoxylated castor oil oleate surfactant | 10.0 |
| Acrylic polymer pour point depressant | 2.0 |

The resulting pesticidal composition Example 2 was found to have a minimum pour point temperature of approximately 1.5-2.0 C. In one such exemplary embodiment, the white mineral oil may comprise Carnation™ mineral oil available from Sonneborn LLC, of Parsippany, NJ, USA. In some such embodiments, the ethoxylated castor oil oleate surfactant may comprise an ethoxylated castor oil mono-oleate non-ionic surfactant available from BASF of Ludwigshafen, DE. In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, DE, or A S Harrison Co, Pty, of Sydney Australia.

Example 3

An exemplary pesticidal composition comprising neem oil, a suitable surfactant, and a polymeric pour point depressant was prepared according to the following description. In an open mixing vessel, 849 g of cold pressed neem oil, 21 g of white mineral oil, 110 g of ethoxylated castor oil oleate surfactant and 20 g of an acrylic polymer pour point depressant were mixed using a shear mixer at approximately 20 C (room temperature). The composition of the resulting pesticidal composition is therefore as shown below in Table 3:

TABLE 3

Pesticidal Composition Example 3

| Component | % by weight |
| --- | --- |
| Cold pressed neem oil | 84.9 |
| White mineral oil | 2.1 |
| Ethoxylated castor oil oleate surfactant | 11.0 |
| Acrylic polymer pour point depressant | 2.0 |

The resulting pesticidal composition Example 3 was found to have a minimum pour point temperature of approximately 1.5-2.0 C. In one such exemplary embodiment, the white mineral oil may comprise Carnation™ mineral oil available from Sonneborn LLC, of Parsippany, NJ, USA. In some such embodiments, the ethoxylated castor oil oleate surfactant may comprise an ethoxylated castor oil mono-oleate non-ionic surfactant available from BASF of Ludwigshafen, DE. In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, DE, or A S Harrison Co, Pty, of Sydney Australia.

Example 4

An exemplary pesticidal composition comprising neem oil, a suitable surfactant, and a polymeric pour point depressant was prepared according to the following description. In an open mixing vessel, 849 g of cold pressed neem oil, 11 g of white mineral oil, 120 g of ethoxylated castor oil oleate surfactant and 20 g of an acrylic polymer pour point depressant were mixed using a shear mixer at approximately 20 C (room temperature). The composition of the resulting pesticidal composition is therefore as shown below in Table 4:

TABLE 4

Pesticidal Composition Example 4

| Component | % by weight |
| --- | --- |
| Cold pressed neem oil | 84.9 |
| White mineral oil | 1.1 |
| Ethoxylated castor oil oleate surfactant | 12.0 |
| Acrylic polymer pour point depressant | 2.0 |

The resulting pesticidal composition Example 4 was found to have a minimum pour point temperature of approximately 1.5-2.0 C. In one such exemplary embodiment, the white mineral oil may comprise Carnation™ mineral oil available from Sonneborn LLC, of Parsippany, NJ, USA. In some such embodiments, the ethoxylated castor oil oleate surfactant may comprise an ethoxylated castor oil mono-oleate non-ionic surfactant available from BASF of Ludwigshafen, DE. In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, DE, or A S Harrison Co, Pty, of Sydney Australia.

Example 5

An exemplary pesticidal composition comprising neem oil, a suitable surfactant, and a polymeric pour point depressant was prepared according to the following description. In an open mixing vessel, 849 g of cold pressed neem oil, 76 g of white mineral oil, 50 g of octylphenol ethoxylate surfactant, 5 g of safflower oil, and 20 g of an acrylic polymer pour point depressant were mixed using a shear mixer at approximately 20 C (room temperature). The composition of the resulting pesticidal composition is therefore as shown below in Table 5:

TABLE 5

Pesticidal Composition Example 5

| Component | % by weight |
| --- | --- |
| Cold pressed neem oil | 84.9 |
| White mineral oil | 8.1 |
| Octylphenol ethoxylate surfactant | 5.0 |

TABLE 5-continued

Pesticidal Composition Example 5

| Component | % by weight |
|---|---|
| Safflower Oil | 0.5 |
| Acrylic polymer pour point depressant | 2.0 |

The resulting pesticidal composition Example 5 was found to have a minimum pour point temperature of approximately 1.5-2.0 C. In one such exemplary embodiment, the white mineral oil may comprise Carnation™ mineral oil available from Sonneborn LLC, of Parsippany, NJ, USA. In some such embodiments, the octylphenol ethoxylate surfactant may comprise Triton X-45 surfactant available from Dow Chemical Co., of Midland, MI, USA. In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, Germany, or A S Harrison Co, Pty, of Sydney Australia.

Example 6

An exemplary pesticidal composition comprising karanja oil, a suitable surfactant, and a polymeric pour point depressant was prepared according to the following description. In an open mixing vessel, 849 g of cold pressed karanja oil, 76 g of white mineral oil, 50 g of octylphenol ethoxylate surfactant, 5 g of safflower oil, and 20 g of an acrylic polymer pour point depressant were mixed using a shear mixer at approximately 20 C (room temperature). The composition of the resulting pesticidal composition is therefore as shown below in Table 6:

TABLE 5

Pesticidal Composition Example 6

| Component | % by weight |
|---|---|
| Cold pressed karanja oil | 84.9 |
| White mineral oil | 8.1 |
| Octylphenol ethoxylate surfactant | 5.0 |
| Safflower Oil | 0.5 |
| Acrylic polymer pour point depressant | 2.0 |

In one exemplary embodiment, the pesticidal composition Example 6 may be prepared from, for example, white mineral oil which comprises Carnation™ mineral oil available from Sonneborn LLC, of Parsippany, NJ, USA. In some such embodiments, the octylphenol ethoxylate surfactant may comprise Triton X-45 surfactant available from Dow Chemical Co., of Midland, MI, USA. In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, Germany, or A S Harrison Co, Pty, of Sydney Australia.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A pesticidal composition comprising
    a pesticidal natural oil active ingredient;
    a surfactant in an amount operable to disperse the pesticidal natural oil active ingredient in a water emulsion; and
    a polymeric pour point depressant in an amount effective to reduce a pour point temperature of said pesticidal natural oil active ingredient, wherein the polymeric pour point depressant comprises at least one of a crystallization inhibitor and a co-crystallization modifier of at least one wax component of the pesticidal natural oil.

2. The pesticidal composition according to claim 1, wherein the pesticidal natural oil active ingredient is selected from the list comprising: neem oil, karanja oil, cinnamon oil, clove oil, eugenol, oregano oil, thyme oil, garlic oil, anise oil, geranium oil, lime oil, peppermint oil, lavender oil, and combinations thereof.

3. The pesticidal composition according to claim 1, wherein said pour point temperature of said pesticidal natural oil active ingredient is between about-5C and about 30C.

4. The pesticidal composition according to claim 2, wherein the pesticidal natural oil active ingredient comprises neem oil.

5. The pesticidal composition according to claim 1, wherein the polymeric pour point depressant comprises at least one of an acrylic polymer and an alkyl aromatic polymer.

6. The pesticidal composition according to claim 5, wherein the polymeric pour point depressant comprises at least one of: a poly methacrylate, a polyalkyl methacrylate, a polyacrylate, an acrylate-styrene copolymer and an alkyl aromatic polymer; wherein
    optionally the polymeric pour point depressant additionally comprises a neutral oil.

7. The pesticidal composition according to claim 1, wherein the surfactant comprises at least one of: ethoxylated castor oil, saponin, ethoxylated alcohols, ethoxylated fatty esters, alkoxylated glycols, ethoxylated fatty acids, carboxylated alcohols, carboxylic acids, fatty acids, ethoxylated alkylphenols, fatty esters, sodium dodecylsulfide, other fatty acid-based surfactants, other natural or synthetic surfactants, or a combination thereof; and/or wherein the surfactant comprises a non-ionic surfactant comprising at least one of: ethoxylated castor oil, an oleate, an octyl-phenol ethoxylate, and combinations thereof.

8. The pesticidal composition according to claim 1, additionally comprising a diluent, wherein the diluent optionally comprises at least one of:
    mineral oil, safflower oil, canola oil, a neutral oil, isopropyl alcohol, isopropyl myristate, and combinations thereof.

9. The pesticidal composition according to claim 1, wherein the pesticidal natural oil active ingredient comprises at least one of neem oil and karanja oil, and wherein the polymeric pour point depressant is operable to inhibit or modify crystallization of at least one of a wax and a fatty acid component of said pesticidal natural oil, wherein said at least one component has a melting point above about 15 C.

10. The pesticidal composition according to claim 1, additionally comprising at least one additional natural pesticidal active ingredient, wherein the additional natural pesticidal active ingredient optionally comprises an extract of at least one natural pesticidal oil.

11. The pesticidal composition according to claim 1, wherein the natural pesticidal oil active ingredient comprises at least one USDA NOP-listed organic natural oil, and/or wherein the at least one polymeric pour point depressant comprises a USDA NOP-listed organic polymeric compound.

12. The pesticidal composition according to claim 1, wherein the composition comprises a substantially homogenous pesticidal concentrate, wherein:
the pesticidal natural oil active ingredient comprises 50 to 90 wt %;
the surfactant comprises 5 to 20 wt %; and
the polymeric pour point depressant comprises 0.1 to 10 wt % of the pesticidal concentrate.

13. The pesticidal composition according to claim 12, additionally comprising a diluent which comprises 5 to 20 wt %.

14. A method of making a diluted pesticidal composition including at least one pesticidal natural oil active ingredient, comprising:
providing a homogenous concentrate composition which comprises a pesticidal composition as defined in claim 1; and
diluting the concentrate with water to form an oil in water emulsion diluted formulation comprising the at least one pesticidal natural oil active ingredient.

15. The method according to claim 14, wherein said pour point temperature of said pesticidal natural oil active ingredient is between about −5 C and about 30 C.

16. The method according to claim 14, wherein the pesticidal natural oil active ingredient comprises neem oil.

17. The method according to claim 14, wherein the polymeric pour point depressant comprises at least one of an acrylic polymer and an alkyl aromatic polymer; and/or wherein the polymeric pour point depressant comprises at least one of: a poly methacrylate, a polyalkyl methacrylate, a polyacrylate, an acrylate-styrene copolymer and an alkyl aromatic polymer.

18. The method according to claim 17 wherein the polymeric pour point depressant additionally comprises a neutral oil; and/or wherein the polymeric pour point depressant comprises at least one of a crystallization inhibitor and a co-crystallization modifier of at least one wax component of the pesticidal natural oil.

19. A method of enhancing the physical properties of a pesticidal natural oil active ingredient comprising at least one of neem and karanja oil, the method comprising:
preparing a homogenous pesticidal concentrate composition comprising a pesticidal composition as defined in claim 1,
said pesticidal natural oil active ingredient comprising at least one of neem and karanja oil; and
diluting the pesticidal concentrate with water to form an oil in water emulsion diluted formulation comprising the at least one pesticidal natural oil active ingredient adapted for application to plants to control at least one pest.

20. A method of applying at least one pesticidal composition comprising at least one pesticidal natural oil to control at least one plant pest, comprising:
preparing a homogenous pesticidal concentrate composition according to claim 2; and
applying the oil-in-water emulsion diluted pesticidal formulation to at least one plant, the locus thereof, or propagation material thereof, which is susceptible to or infested with the at least one plant pest.

* * * * *